United States Patent [19]
Thomasson

[11] Patent Number: 6,140,799
[45] Date of Patent: Oct. 31, 2000

[54] SWITCHED BATTERY-BANK ASSEMBLY FOR PROVIDING INCREMENTAL VOLTAGE CONTROL

[76] Inventor: Mark J. Thomasson, 1236 Fawn Valley Dr., League City, Tex. 77573

[21] Appl. No.: 09/342,488

[22] Filed: Jun. 29, 1999

[51] Int. Cl.[7] .................................................. H01M 10/44
[52] U.S. Cl. .......................................... 320/117; 320/118
[58] Field of Search ..................................... 320/116, 117, 320/118, 135, 136; 307/50, 44, 46, 65, 66

[56] References Cited

U.S. PATENT DOCUMENTS

| | | | |
|---|---|---|---|
| 5,453,643 | 9/1995 | Yang | 307/71 |
| 5,461,264 | 10/1995 | Yang | 307/81 |
| 5,483,433 | 1/1996 | Yang | 363/43 |
| 5,506,456 | 4/1996 | Yang | 307/81 |
| 5,514,916 | 5/1996 | Yang | 307/81 |
| 5,710,504 | 1/1998 | Pascual | 320/6 |
| 5,712,553 | 1/1998 | Hallberg | 320/15 |
| 5,742,150 | 4/1998 | Khuwatsamrit | 320/118 X |
| 5,867,007 | 2/1999 | Kim | 320/118 |
| 5,898,291 | 4/1999 | Hall | 320/118 X |

*Primary Examiner*—Edward H. Tso
*Attorney, Agent, or Firm*—Harrison & Egbert

[57] ABSTRACT

A system for obtaining a variable voltage output from an assembly of battery banks and switches. The battery banks are composed of a plurality of individual cells that are connected in series so that the first bank is composed of one cell, and each succeeding bank has double the number of cells as the previous bank. A corresponding plurality of mechanical or solid state switches are interconnected with the series of batteries so that output voltage may be varied in increments equal to the voltage of one cell. The output voltage is varied from zero to a maximum corresponding to the sum of the voltages of all the battery-banks in series. The number of steps between the minimum and the maximum is equal to the number of cells in all the battery-banks.

8 Claims, 12 Drawing Sheets

Incremental Voltage Control, 4 Batteries, 15 Cells, 15 Steps

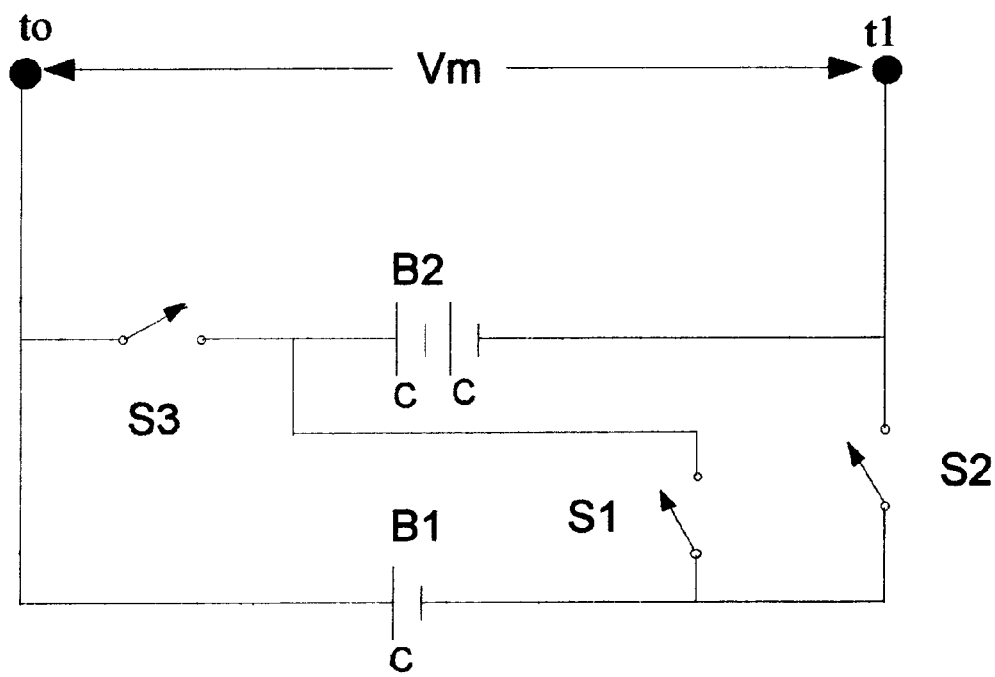
Figure 1. Incremental Voltage Control, 2 Batteries, 3 Cells, 3 Voltage Steps

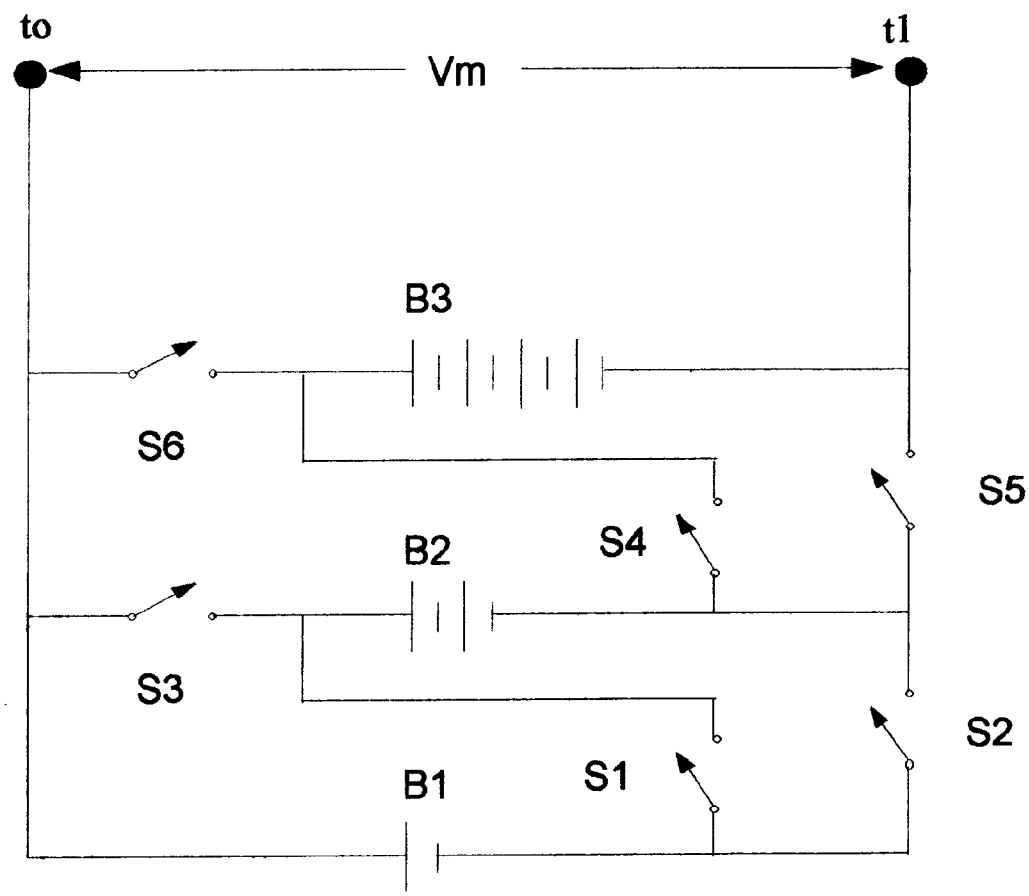
Figure 2. Incremental Voltage Control, 3 Batteries, 7 Cells, 7 Voltage Steps

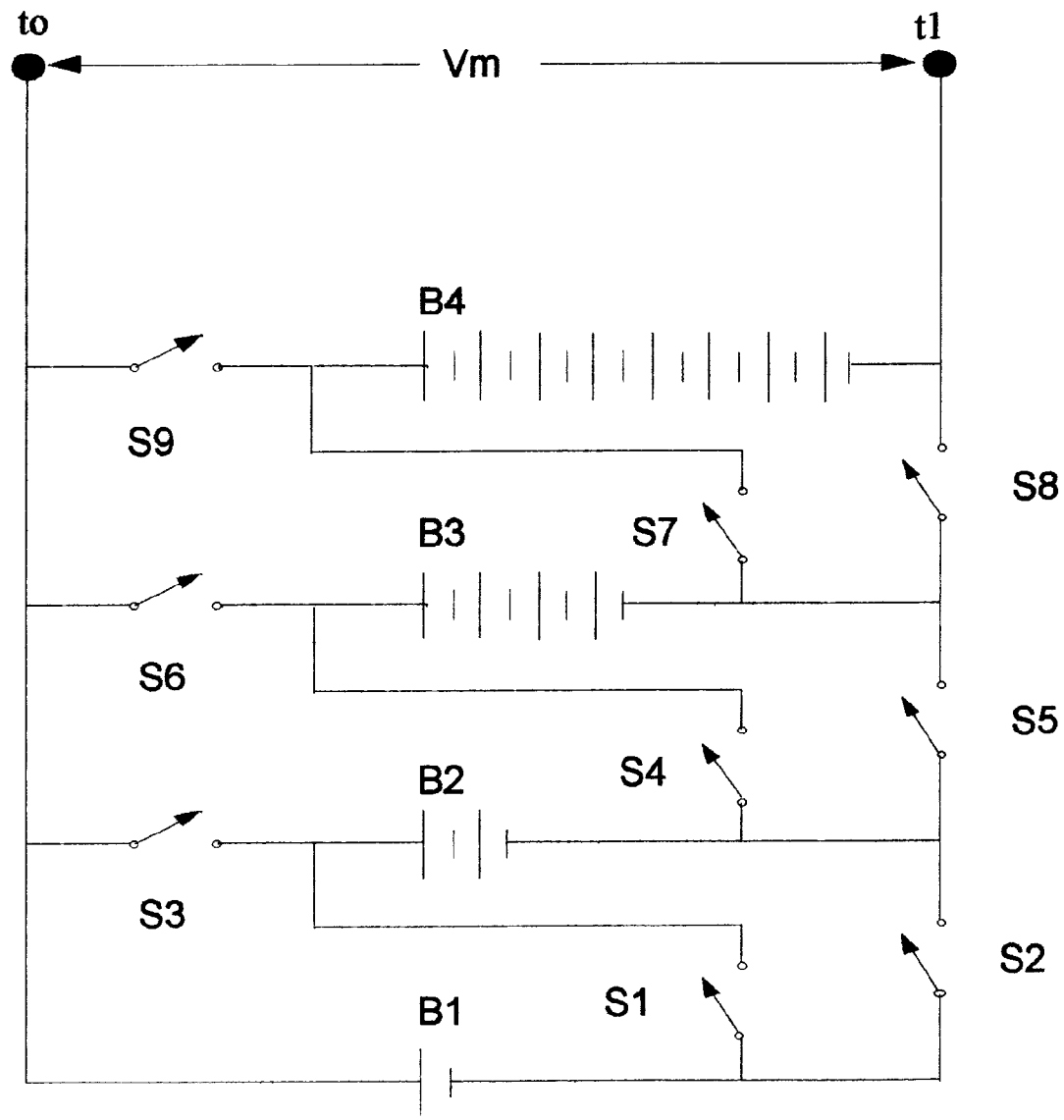
Figure 3. Incremental Voltage Control, 4 Batteries, 15 Cells, 15 Steps

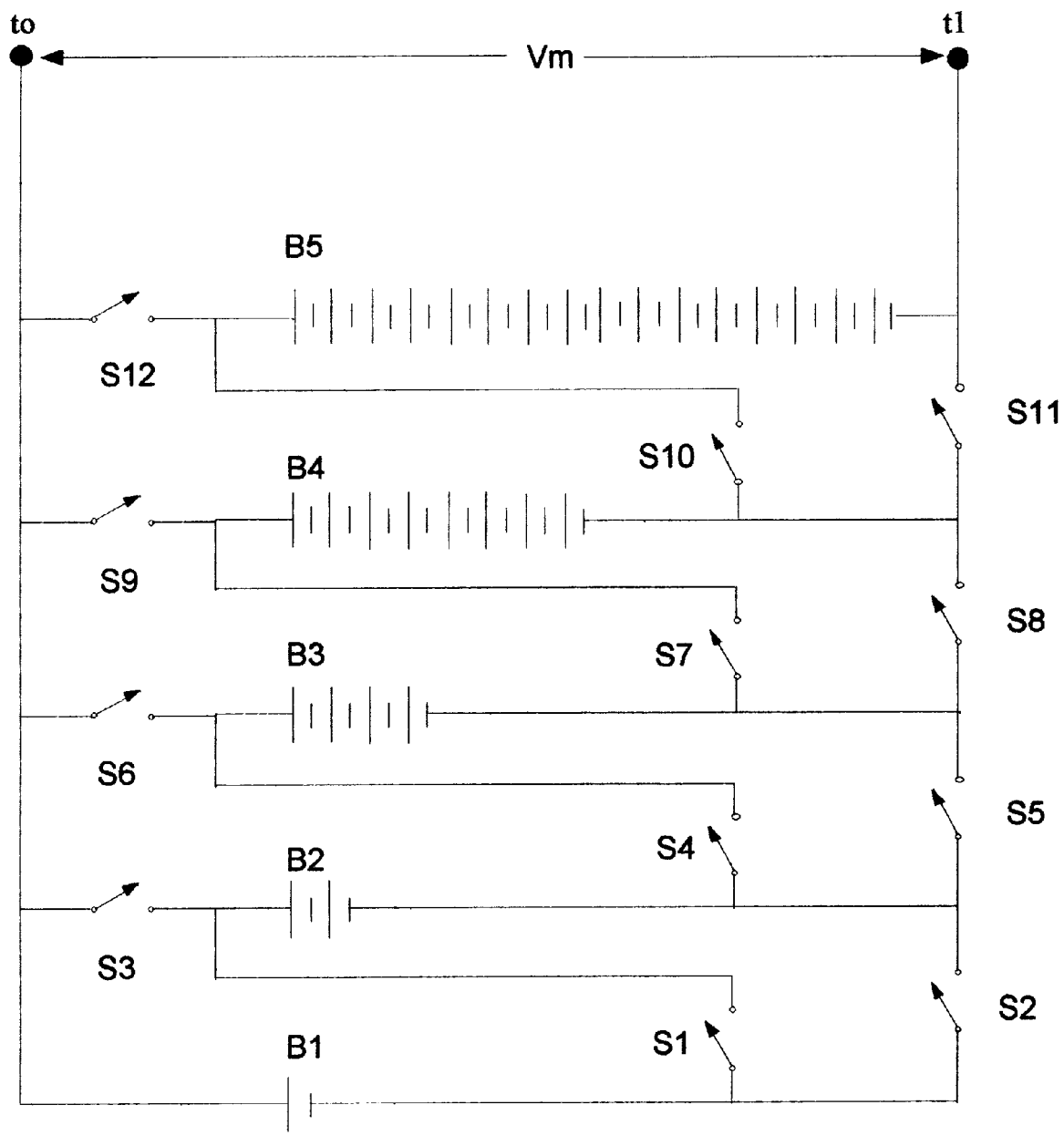
Figure 4. Incremental Voltage Control, 5 Batteries, 31 Cells, 31 Steps

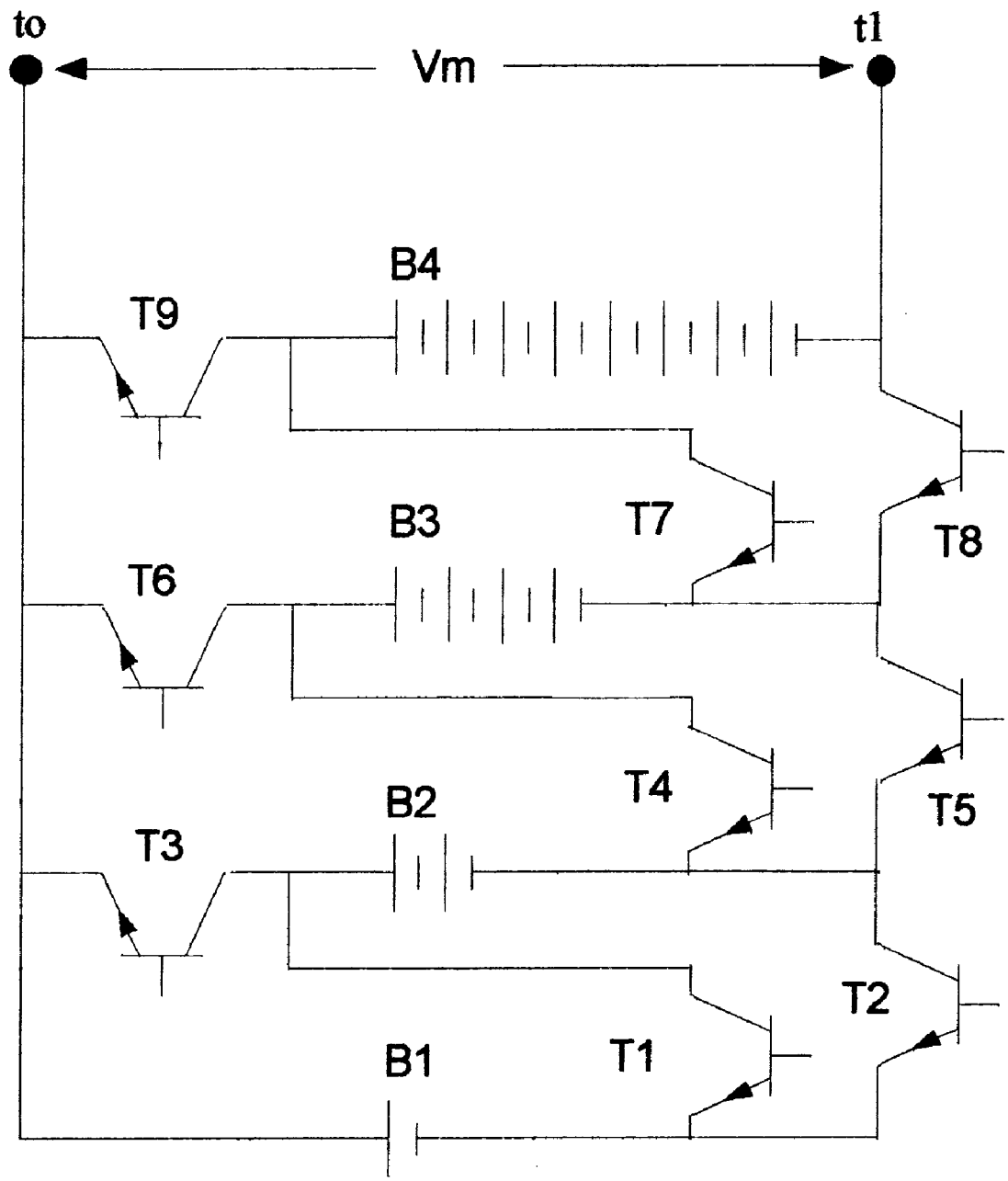
Figure 5. Solid State Switching Using Transistors

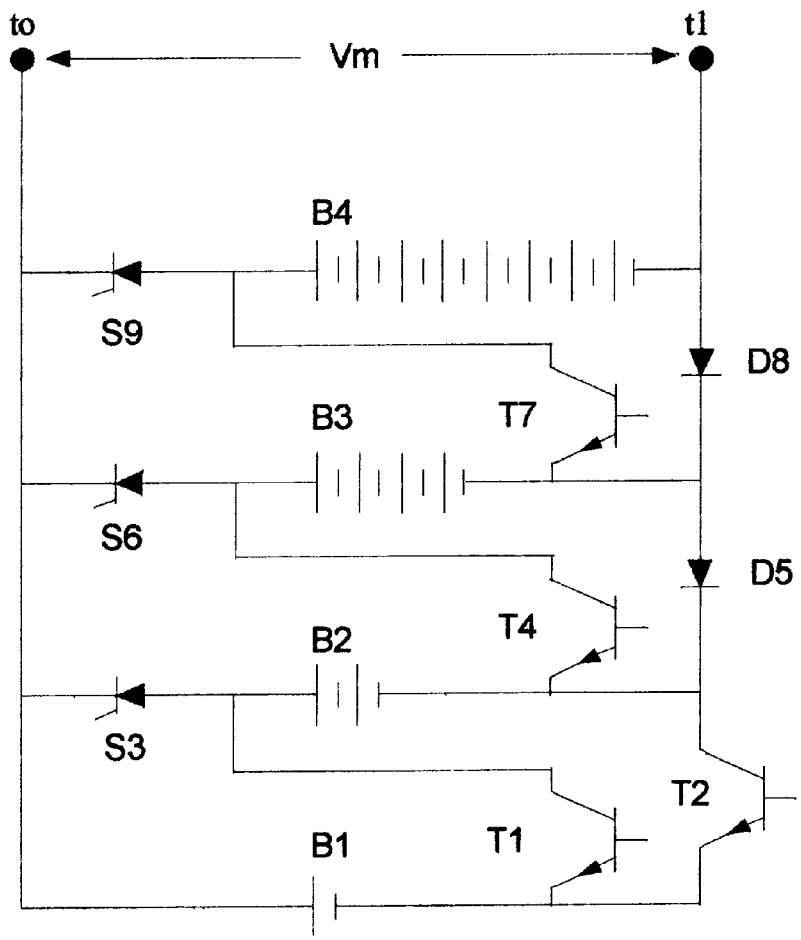
Figure 6. Solid State Switching Using SCR's and Diodes in Place of Some Transistors

Figures 7A, B, C. Voltage Control with 2 Batteries, 3 Cells, 3 Voltage Steps
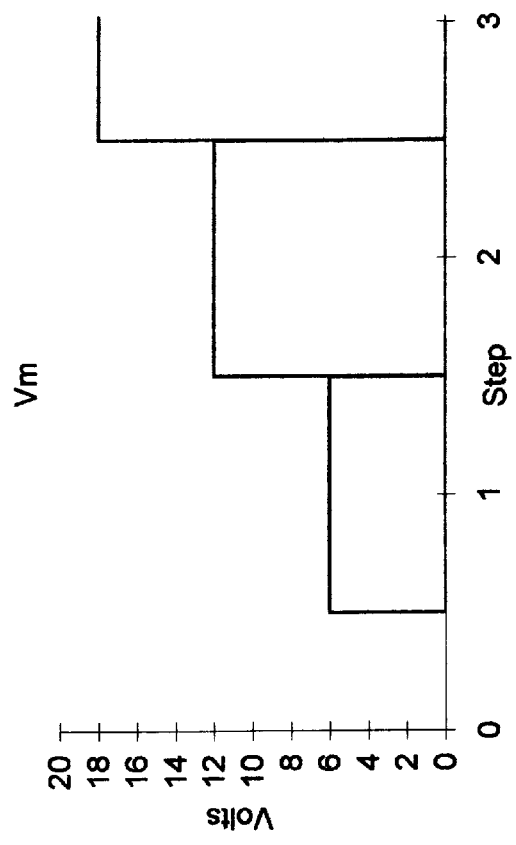
Figure 7B. Output Graph
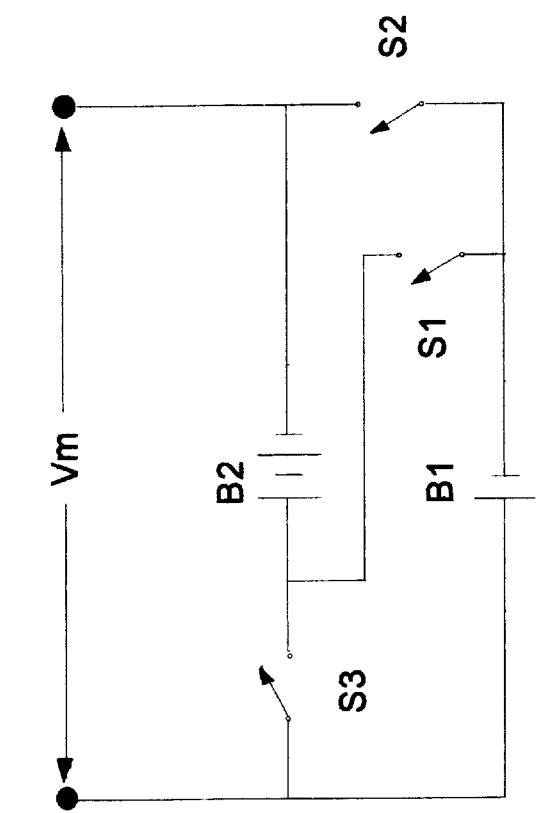
Figure 7A. Circuit
B1 = 6 volts
B2 = 12 volts
| Switch Logic | | | | Batteries in use | |
|---|---|---|---|---|---|
| Vm | S1 | S2 | S3 | B1 | B2 |
| 0 | | | | | |
| 6 | | X | | X | |
| 12 | | | X | | X |
| 18 | X | | | X | X |
Figure 7C. Switch Logic Table

Figures 8A, B, C. Voltage Control with 3 Batteries, 7 Cells, 7 Voltage Steps
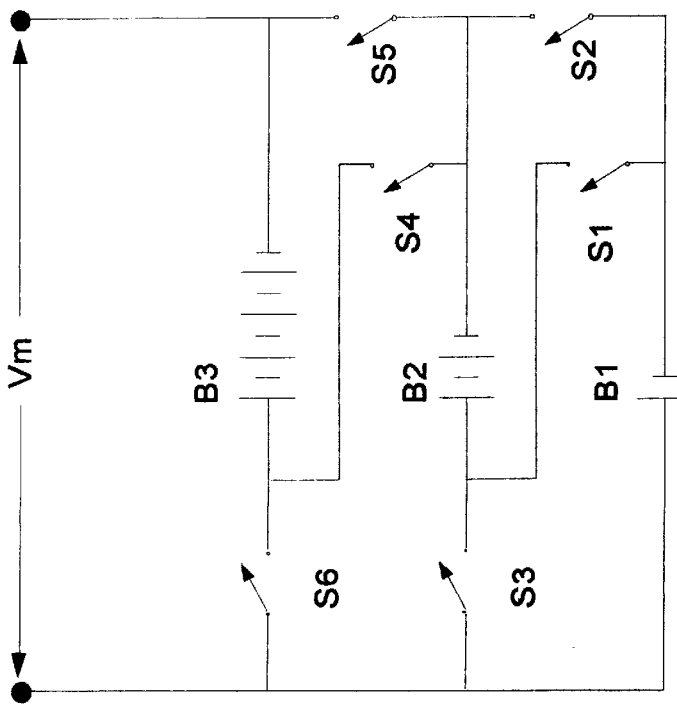
Figure 8A. Circuit
B1 = 6 volts
B2 = 12 volts
B3 = 24 volts
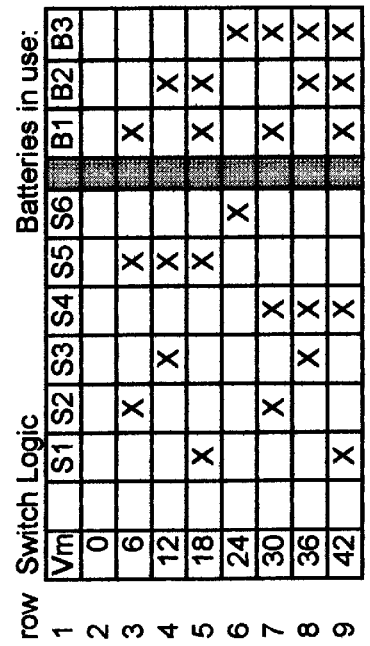
Figure 8B. Output Graph
Figure 8C. Switch Logic Table
| row | Switch Logic | | | | | | | Batteries in use: | | |
|---|---|---|---|---|---|---|---|---|---|---|
| | Vm | S1 | S2 | S3 | S4 | S5 | S6 | B1 | B2 | B3 |
| 1 | 0 | | | | | | | | | |
| 2 | 6 | | X | | | | | X | | |
| 3 | 12 | | | | X | | | | X | |
| 4 | 18 | X | | | X | X | | X | X | |
| 5 | 24 | | | | | X | X | | | X |
| 6 | 30 | X | | | | X | X | X | | X |
| 7 | 36 | | | X | X | | X | | X | X |
| 8 | 42 | X | X | | X | | X | X | X | X |

Figure 9A, B, C. Voltage Control with 4 Batteries, 15 Cells, 15 Voltage Steps
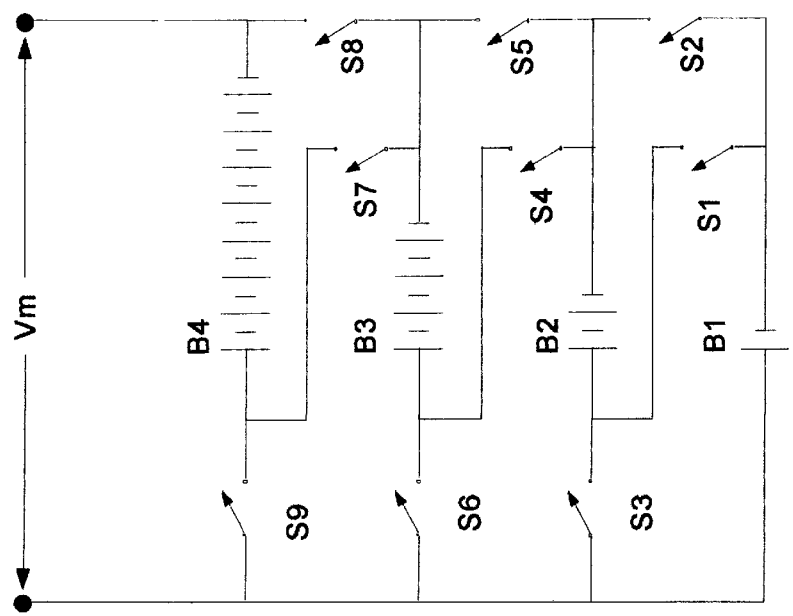
Figure 9A. Circuit
B1 = 6 volts
B2 = 12 volts
B3 = 24 volts
B4 = 48 volts
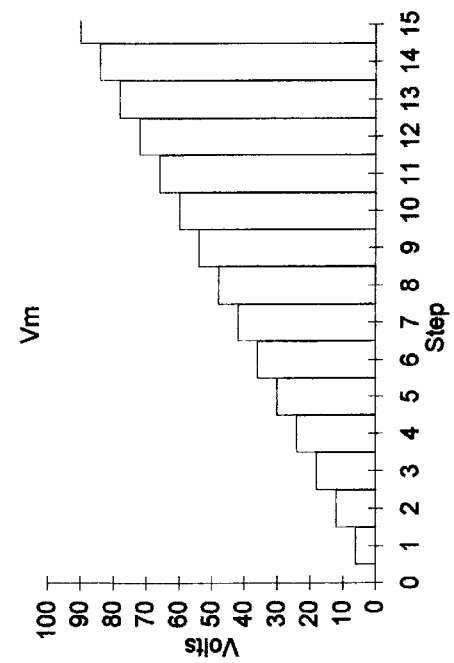
Figure 9B. Output Graph
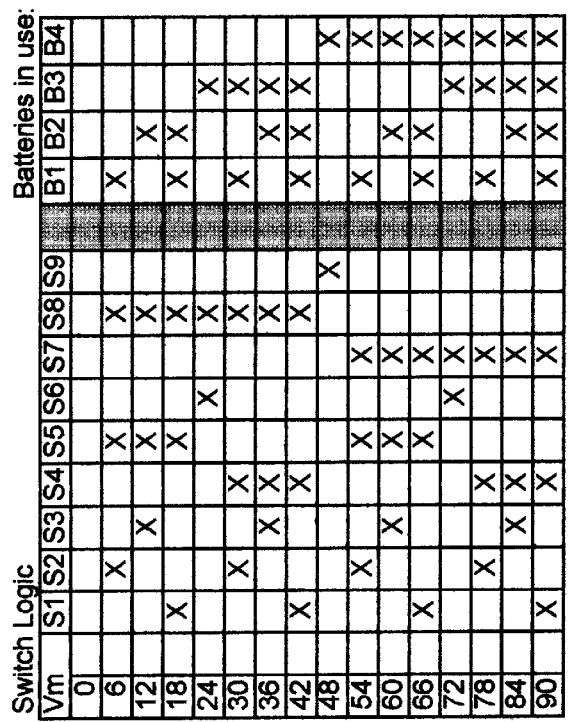
Figure 9C. Switch Logic Table Figure 10A, B, C. Incremental Voltage Control from Batteries Banks
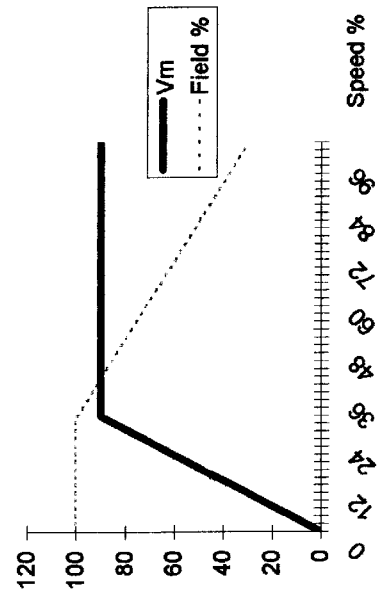
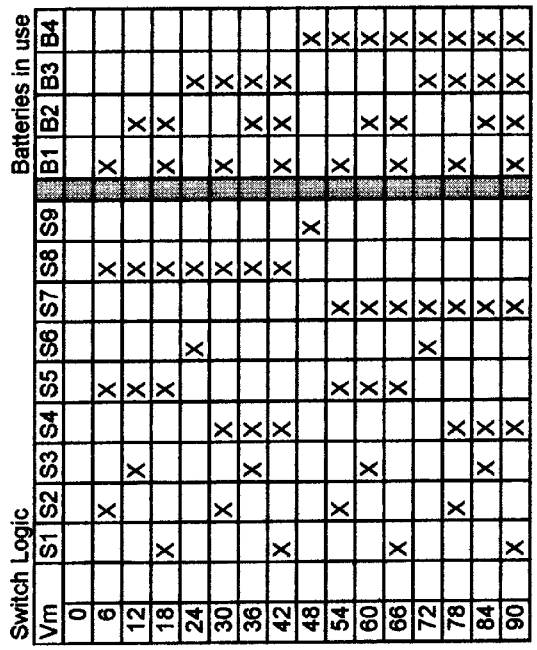
Figure 10B. Output Graph
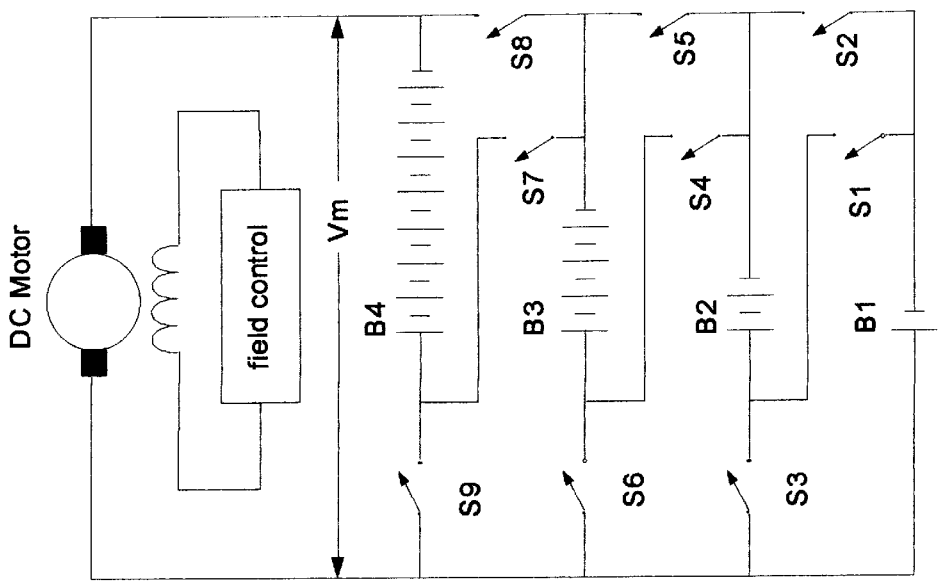
Figure 10A. Circuit
B1 = 6 volts
B2 = 12 volts
B3 = 24 volts
B4 = 48 volts
Figure 10C. Switch Logic Table

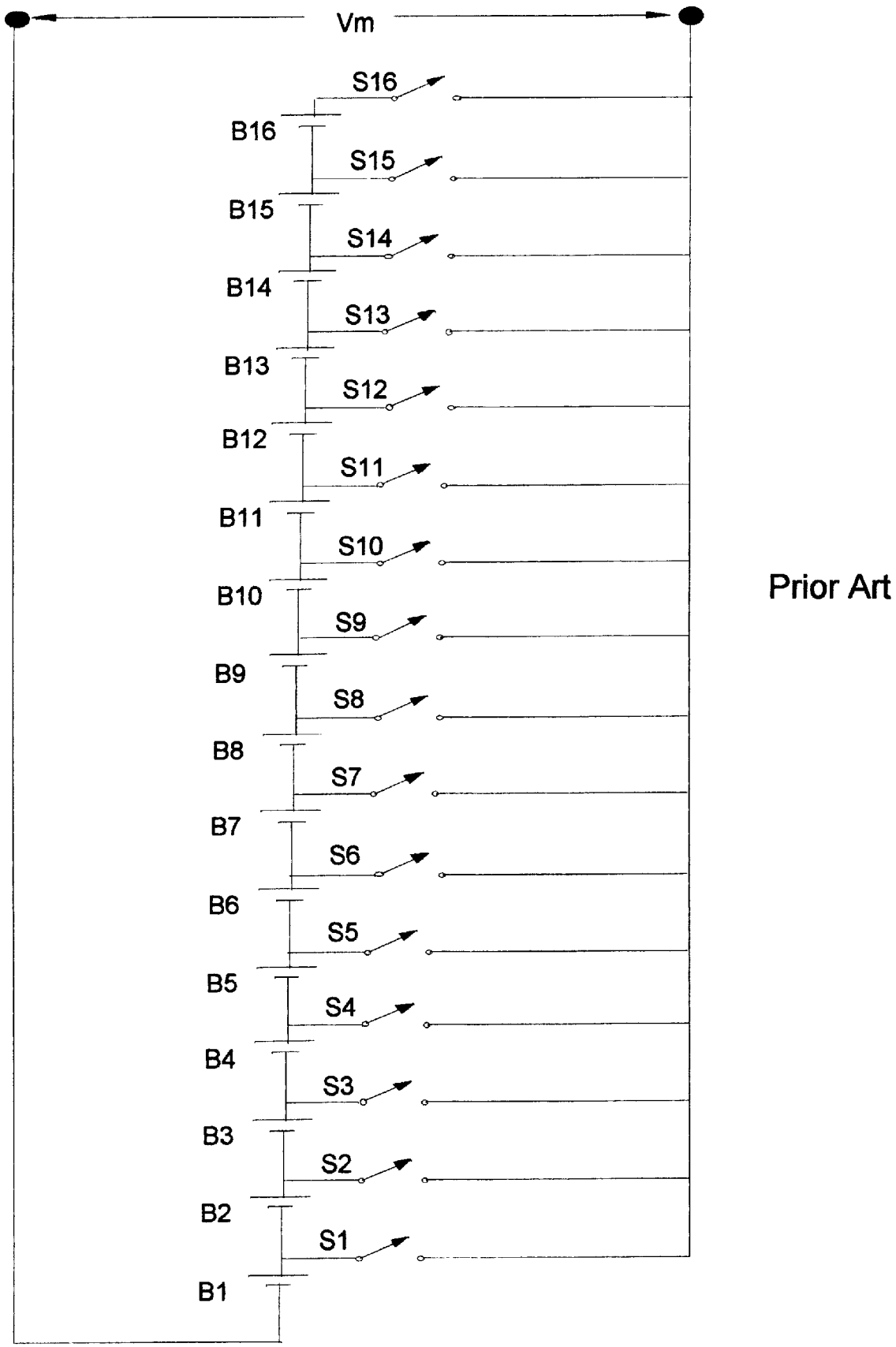
Figure11. An Obvious Circuit for Varying the Voltage Output from Battery Banks

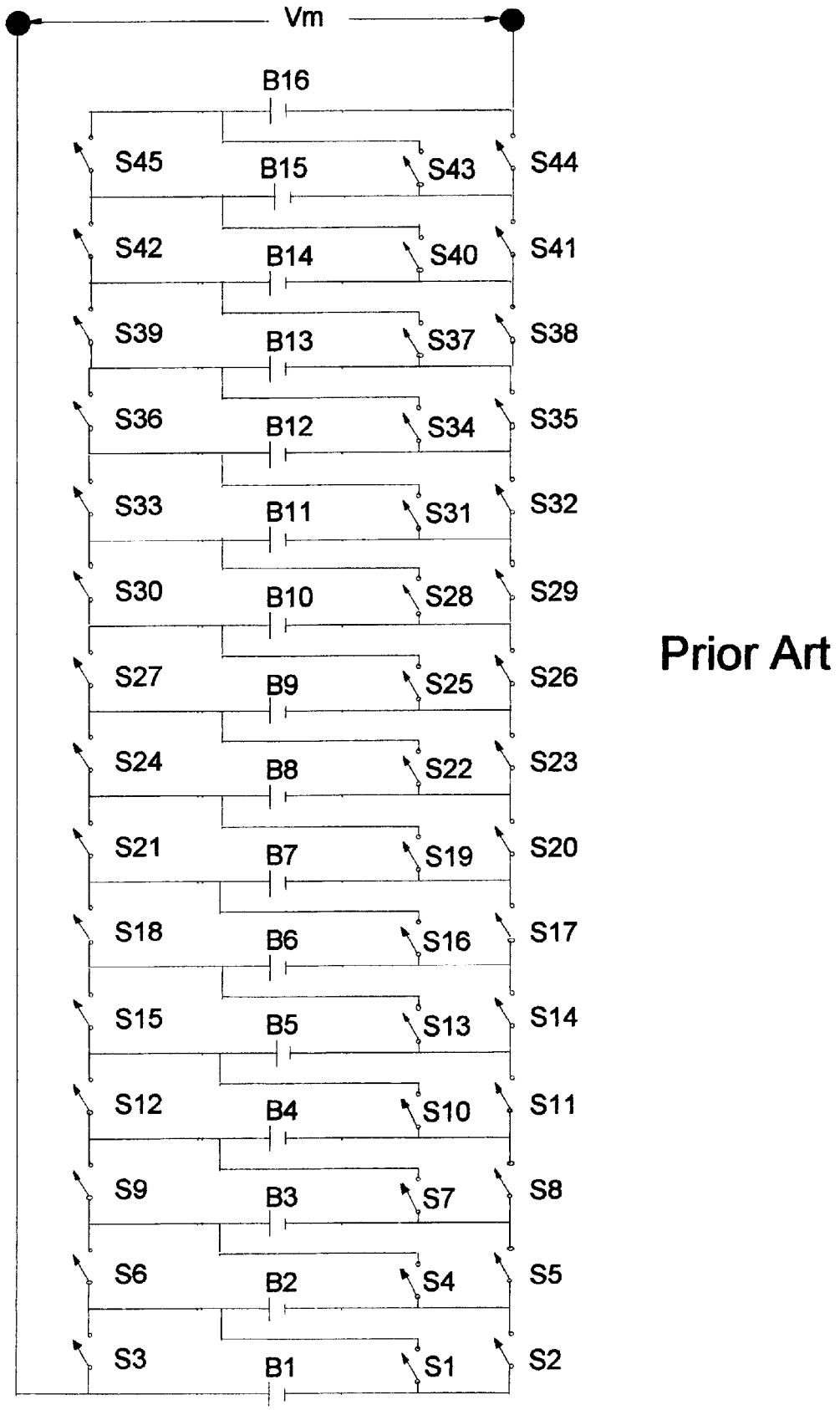
Figure 12. Another Obvious Circuit for Varying the Voltage Output from Battery Banks 6,140,799

SWITCHED BATTERY-BANK ASSEMBLY FOR PROVIDING INCREMENTAL VOLTAGE CONTROL

BACKGROUND OF THE INVENTION

The present invention pertains to battery-powered devices, and, more particularly, pertains to an apparatus and method for obtaining incremental variable voltage from switchable configurations of banks of battery cells.

It is well known that battery-powered devices often require variable voltage output from a power supply in order to perform normal functions. An electric vehicle drive is a good example of this kind of device. Typically, the fill voltage of the battery bank is switched on and off at a rapid rate to turn the constant voltage of the battery bank into a lower effective voltage to the load. Voltage is made lower by leaving the switches off for longer periods of time; and, conversely, voltage is made higher by leaving the switches on for longer periods of time. This method of voltage control is sometimes called Pulse Width Modulation (PWM) or Pulse Frequency Modulation (PFM). As will be understood by those skilled in the art, for the electric vehicle, voltage is low for slow speeds and higher for faster speeds.

These common methods of voltage control have several limitations that are known in the art. First, pulsing the voltage and, consequently, the power, on-and-off requires a relatively complex circuit to turn the power-controlling components on-and-off at a rapid rate. Second, the pulsed output requires expensive filtering components to remove high frequency harmonics from the power being delivered to the load. Next, the control range is only 4 to 1 for many high power applications. This limitation occurs, of course, because the current requirements for loads such as DC motors do not decrease with voltage. As the PWM or PFM method reduces the time that the power controlling device is on to reduce the voltage, current—that can only flow when the device is on—is squeezed into narrower time pulses. To keep the average current to the motor constant, the current flow during the pulse must rise. For example, if the voltage output were reduced to one half of maximum by leaving the power controlling device off for half of the time, then current during the on-time of the device must be twice as high. At one quarter voltage output, current must be four times as high. Solid state devices, in particular, have definite maximum current limits. Increasing the controlling range of a PWM or PFM system increases the maximum current flow and the cost of the components. Furthermore, if regenerative braking is used, another power circuit is needed to control the current flow back to the batteries.

There have been several improvements in the art to extend the reach of battery power. For example, Field et al., in U.S. Pat. No. 4,788,480, teach an apparatus for controlling the output of battery-driven motors, wherein either of two available voltages is obtained from a portion of the battery supply while simultaneously avoiding unequal battery-drainage. In U.S. Pat. No. 5,710,504, Pascual et al. disclose a method for equalizing recharging of a bank of batteries configured in a series relationship. Having a plurality of switches for controlling current flow, charge is shifted between two adjacent batteries so that the action of repeated back-and-forth capacitor-switching equalizes the voltages of the batteries in the battery bank. Similarly, in U.S. Pat. No. 5,712,553, Hallberg teaches an apparatus including a transposition circuit that uses switches for selectively changing the order of series-connected batteries, for equalizing battery consumption in a power supply that provides at least two uniform and different voltage outputs.

Yang attempts to improve the art in his disclosures in U.S. Pat. Nos. 5,506,456; 5,461,264; 5,483,643; and 5,514,480. More particularly, in his '264 and '456 patents, Yang teaches apparatus that interconnects a bank of batteries in a series and parallel relationship using a plurality of switches, for equally draining of these batteries. It should be dear to those skilled in the art that the battery-switching methodology used in this apparatus effectuates large voltage level jumps at the upper voltage range. To deal with this situation, an additional modulation circuit is included to vary the voltage across these large jumps, which, of course, significantly increases the complexity and associated cost thereof. While requiring many components, this apparatus keeps all of the batteries in the circuit so that equal draining inherently occurs under all load conditions. In the '916 patent, he discloses an apparatus for reducing sparking by combining solid state switching with electromechanical switches and, in the '643 patent, Yang teaches a transforming circuit for converting DC to variable voltage AC. In the '433 patent, he discloses a voltage control circuit for providing incremental voltage control that, unfortunately, engenders considerable power loss attributable to a large number of prerequisite components therein.

It is well known that battery banks are composed of individual low voltage cells usually connected in series. When batteries are connected in series, the voltages of all the cells are added together to produce the output voltage of the total battery bank. This output is normally applied to a PWM or PFC controller to vary the voltage. Heretofore unknown in the art is a manner or means for varying the output voltage from a battery bank by varying the number of battery cells placed in series. An advantage of this approach would be that the many incremental voltages inherently available inside the battery bank would be available for use, while avoiding the complex circuitry need to produce the incremental voltages otherwise, i.e., artificially. Of course, it is common practice in the art to use battery banks having a large plurality of switches to provide varying power, but such arrangements are also complex and inefficient.

Thus, it is dear that there is presently no device or procedure that enables incremental voltage control to be simply attained from a switchable bank of low voltage battery cells. Accordingly, these limitations and disadvantages of the prior art are overcome with the present invention, and improved means and techniques are provided that are useful for effectively and inexpensively controlling the voltage produced by a bank of battery cells.

SUMMARY OF THE INVENTION

The present invention teaches a control circuit and method for arranging a plurality of low voltage battery cells and switches for reducing the number of switches needed to effectuate incremental voltage control. As will be hereinafter described in detail, a plurality of battery cells are arranged in banks of series of interconnected cells. As contemplated by the present invention, the first bank of battery cells is configured with one cell, the second bank is configured with two cells in series, the third bank is configured with four cells in series, the fourth bank is configured with eight cells in series, etc., until the total number of cells prerequisite to achieve the maximum voltage output is reached.

It is a feature of the present invention that each successive battery bank has twice the number of cells as the previous bank. As will be hereinafter described in detail, a corresponding plurality of switches is arranged to allow interconnection of the plurality of banks in any series combination, so that the voltage level of the total bank may be controlled in one-cell increments from zero to the maximum voltage provided by the cascaded cells available when all of the banks are disposed in a series relationship.

It will be appreciated that it is another advantage of the battery cell bank assembly taught by the present invention is that loading throughout the battery bank will be evenly distributed across all of the cells. Thus, under circumstances in which a wide range of voltage must be provided, such as the variable speeds required when a vehicle is driven in city stop-and-go traffic, all cells are implicated during the delivery of varying power and, indeed, certain cells are not left out of the power-delivery loop just because maximum speed is never or rarely maintained. The present invention inherently optimizes utilization of each and every cell in the plurality of battery banks of cells.

It is an object of the present invention to provide a means and method for economically and efficiently obtaining incremental variable voltage control from switchable banks of battery cells.

It is another object of the present invention to provide a means and method that quickly enables battery-based speed control that exploits the incremental unit characteristic of portable DC power sources.

It is another object of the present invention to provide a means and method for obtaining incremental variable voltage control from switchable banks of battery cells that inherently distributes load across all battery cells in the circuit.

These and other objects and features of the present invention will become apparent from the following detailed description, wherein reference is made to the figures in the accompanying drawings.

DESCRIPTION OF THE DRAWINGS

FIG. 1 depicts a switched battery-bank having a two-battery, three-cell, three-switch, three voltage increment embodiment of the invention.

FIG. 2 depicts a switched battery-bank having a three-battery, seven-cell, six-switch, seven voltage increment embodiment of the invention.

FIG. 3 depicts a switched battery-bank having a four-battery, fifteen-cell, nine-switch, fifteen voltage increment embodiment of the invention.

FIG. 4 depicts a switched battery-bank having a five-battery, thirty-one-cell, twelve-switch, thirty-one voltage increment embodiment of the invention.

FIG. 5 depicts a switched battery-bank having an alternative embodiment of the voltage control circuit depicted in FIG. 3, using solid state transistor switches.

FIG. 6 depicts a switched battery-bank having an alternative embodiment of the voltage control circuit depicted in FIG. 5, using transistors, SCR and diode switches.

FIGS. 7A, B, C depict the voltage control circuit, stepwise output voltage increments, and corresponding switching logic table, respectively, for the embodiment of the present invention depicted tin in FIG. 1.

FIGS. 8A, B, C depict the voltage control circuit, stepwise output voltage increments, and corresponding switching logic table, respectively, for the embodiment of the present invention depicted tin in FIG. 2.

FIGS. 9A, B, C depict the voltage control circuit, stepwise output voltage increments, and corresponding switching logic table, respectively, for the embodiment of the present invention depicted tin in FIG. 3.

FIG. 10 depicts the switching logic and output graph for an electrical vehicle drive system.

FIG. 11 depicts a circuit known in the art for reconnecting a plurality of batteries that are interconnected with a plurality of switches.

FIG. 12 depicts another circuit known in the art for reconnecting a plurality of batteries that are interconnected with a plurality of switches.

DETAILED DESCRIPTION OF THE INVENTION

FIGS. 11 and 12 depict common practice in the art that are used to arrange batteries and switches so that varying voltage may be obtained from battery banks. But such prior art arrangements require many switches, thereby demanding high current and high power.

Now referring to FIG. 1, there is seen a battery bank embodiment of the present invention comprising battery B1 consisting of one cell C and battery B2 consisting of two cells—2C (C+C). Since all of the cells in this embodiment deliver the same voltage C, and battery B2 provides twice the voltage of battery B1. It is also seen that three switches—S1, S2, and S3—interconnect batteries B1 and B2 to output terminals $t_0$ and $t_1$ where any load, such as a motor, may be connected in a manner well known in the art. It should also be evident that batteries B1 and B2 may alternatively be interconnected with each other.

Thus, according to the present invention, assuming that the voltage provided by one cell is V, then, when none of plurality of switches S1, S2, and S3 are closed, no voltage (V×0) or power is applied to the output terminals $t_0$ and $t_1$. On the other hand, when only switch S2 is closed, then only the voltage across battery B1 (V×1) is applied to the output terminals. Similarly, when only switch S3 is closed, only the voltage of battery B2 (V×2) is applied to the output terminals. However, when only switch S1 is closed, battery B1 and battery B2 are in a series relationship, and, accordingly, the sum of their voltages (V×3) is applied to the output terminals.

It will be understood by those skilled in the art that this embodiment of the present invention teaches an electrical circuit configuration that delivers four levels of voltage (including 0 voltage) in three steps. Each of this plurality of voltage levels may be immediately manifest by simply setting the proper switch in the circuit as hereinbefore described.

Referring now to FIG. 2, there is depicted a more complex battery bank configuration of the circuit means for providing incremental voltage control taught by the present invention. Battery B1 consists of one cell (C), battery B2 consists of two cells (2C), and battery B3 consists of four cells (4C). Thus, according to this embodiment of the present invention, battery B3 provides twice the voltage of battery B2 and provides four times the voltage of battery B1. Included in the circuit depicted, is a plurality of switches preferably comprising each of switches S1, S2, S3, S4, S5, and S6 which connect plurality of batteries B1, B2, and B3 to output terminals $t_0$ and $t_1$.

Again, assuming that the voltage provided by each of the like plurality of cells (C) is V, then, when none of plurality of switches S1, S2, S3, S4, S5, or S6 is closed, no voltage (V×0) or power is applied to the output terminals. When both switch S2 and switch S5 are closed, while the remaining plurality of switches S1, S3, S4, and S6 are open, it will be appreciated that only the voltage of battery B1 (V×1) is applied to the output terminals. On the other hand, when only switches S3 and S5 are closed, only the voltage of B2 (V×2) is applied to the output terminals. Similarly, when only switches S1 and S5 are closed, batteries B1 and B2 are in a series relationship, and the sum of their respective voltages (V×3) is applied to the output terminals. When only switch S6 is closed, only the voltage of battery B3 (V×4) is applied to the output terminals. Similarly, when only switches S2 and S4 are closed, then only the voltage of batteries B1 and B3 in series (V×5) is applied to the output terminals. When only switches S3 and S4 are closed, only the voltage of batteries B2 and B3 in series (V×6) is applied to the output terminals. When only switches S1 and S4 are closed, battery B1, battery B2, and battery B3 are all disposed in a series relationship, and the sum of their voltages (V×7) is applied to the output terminals.

Still referring to FIG. 2, it should thus be evident that eight levels of voltage are available under this embodiment of the battery bank circuit taught by the present invention (counting 0 voltage) obtained in seven steps. In a manner heretofore unknown in the art, any of this plurality of voltage levels may be attained by setting the proper switches in the plurality of switches in the circuit of the present invention.

Now referring to FIG. 3, in a similar manner to the battery bank circuits described in FIGS. 1 and 2, adding battery B4 consisting of eight cells (8C, with eight times the voltage of B1) and three additional switches—S7, S8, and S9—provides a battery bank circuit capable of delivering 16 levels of voltage in 15 steps. It will be understood by those skilled in the art that the maximum voltage attainable from this circuit occurs when all of the plurality of batteries B1, B2, B3, and B4 are disposed in a series relationship (V×15).

In a similar manner, as depicted in FIG. 4, adding a fifth battery B5 having sixteen times the voltage of battery B1 and simultaneously adding three more switches S10, S11, and S12, increases the capacity of the battery bank circuit of the present invention to 32 levels of voltage—from 0 voltage—attained in 31 steps. It will be understood that maximum voltage from this circuit occurs when all the plurality of batteries B1, B2, B3, B4 and B5 are in series (V×31).

It should be evident to those skilled in the art that embodiments of the present invention may be configured with still more batteries to increase the number of voltage levels available and the number of incremental steps as appropriate for a particular application.

Now referring to FIGS. 1 and 7A–C, there is shown a synopsis of the relationship between switch closures and output voltage in the two-battery, three-cell, three-switch preferred embodiment of the present invention. Thus, assuming that each cell C of battery B1 and battery B2 in the battery bank circuit depicted identically in FIGS. 1 and 7A produces 6 volts, FIG. 7B depicts the stepwise voltage increments delivered as a consequence of the switch states depicted in the Switch Logic table in FIG. 7C. Ergo, the arrangement of the plurality of switches depicted in successive rows of the table shown in FIG. 7C engenders the three step-wise increments of output voltage $V_m$ from zero to 6 to 12 to 18 volts, corresponding to the open/closed state of each of plurality of switches S1, S2, and S3 shown identically in FIGS. 1 and 7A. The zero voltage row of the Switch Logic table in FIG. 7C clearly shows the battery bank circuit configuration in which all of the switches S1, S2, and S3 are open thereby using neither of batteries B1 and B2. For stepping up to 6 volts output by the battery bank circuit of FIG. 7A, switch S2 is closed and switches S1 and S3 are open, while, consequently, battery B1 is used. For stepping up to 12 volts output by the battery bank circuit of FIG. 7A, switch S3 is closed and switches S1 and S2 are open, while, consequently, battery B2 is used. Finally, for stepping to the third incremental step, thereby generating 18 volts, switch S1 is closed and switches S2 and S3 are open, while, consequently, both batteries B1 and B2 are used.

Now referring to FIGS. 2 and 8A–C, there is shown a synopsis of the relationship between switch closures and output voltage in the three-battery, seven-cell, six-switch preferred embodiment of the present invention. Thus, assuming that each cell C of batteries B1, B2 and B3 in the circuit depicted identically in FIGS. 2 and 8A produces 6 volts, FIG. 8B depicts the step-wise voltage increments delivered as a consequence of the switch states depicted in the Switch Logic table in FIG. 8C. Ergo, the arrangement of the plurality of switches depicted in successive rows of the table shown in FIG. 8C engenders the seven step-wise increments of output voltage $V_m$ from zero to 6 to 12 to 18 to 24 to 30 to 36 to 42 volts, corresponding to the open/closed state of each of plurality of switches S1, S2, S3, S4, S5, and S6 shown identically in FIGS. 2 and 8A. Thus, the zero voltage row of the Switch Logic table in FIG. 8C shows the circuit configuration in which all of the six switches are open thereby using none of batteries B1, B2, and B3.

For stepping up to 6 volts of output by the circuit of FIG. 8A, switches S2 and S5 are closed and remaining switches S1, S3, S4, and S6 are open, while, consequently, battery B1 is used. For stepping up to 12 volts of output by the circuit of FIG. 8A, switches S3 and S5 are closed and remaining switches S1, S2, S4 and S6 are open, while, consequently, battery B2 is used. For stepping to the third incremental step, thereby generating 18 volts, switches S1 and S5 are closed and switches S2, S3, S4, and S6 are open, while, consequently, batteries B1 and B2 are used.

A similar methodology is depicted in rows 6–9 of the Switch Logic table, wherein appropriate switches are configured to achieve incremental 6-volt voltages of 24, 30, 36, and 42 volts. Thus, in the bottom row of the table in FIG. 8C, 42 volts output is achieved by closing switches S1 and S4 of the plurality of switches, thereby using all of batteries B1, B2, and B3. It will be understood that this output of 42 volts is obtained from the cumulation of the single cell of battery B1 (6 v.), the two cells of battery B2 (12 v.), and the four cells of battery B3 (24 v.).

Similarly, referring to FIGS. 3 and 9A–C, there is shown a synopsis of the relationship between switch closures and output voltage in the four-battery, fifteen-cell, nine-switch preferred embodiment of the present invention. Thus, assuming that each cell C of batteries B1, B2, B3 and B4 in the circuit depicted identically in FIGS. 3 and 9A produces 6 volts, FIG. 9B depicts the step-wise voltage increments delivered as a consequence of the switch states depicted in the Switch Logic table in FIG. 9C. Ergo, the arrangement of the plurality of switches depicted in successive rows of the table shown in FIG. 9C engenders the fifteen step-wise increments of output voltage $V_m$ from zero to 90 volts, corresponding to the open/closed state of each of plurality of switches S1, S2, S3, S4, S5, S6, S7, S8 and S9 shown identically in FIGS. 3 and 9A. Thus, the zero voltage row of the Switch Logic table in FIG. 9C shows the circuit configuration in which all of the nine switches are open thereby using none of batteries B1, B2, B3, and B4.

For stepping up to 6 volts of output by the circuit of FIG. 9A, switches S2, S5 and S8 are closed and the remaining plurality of switches are open, while, consequently, battery B1 is used. It will be evident to those skilled in the art from FIGS. 9A–C that each of the incremental 6 volts of output may be attained by the proper arrangement of open and closed switches depicted therein. Thus, the maximum output, represented by the bottom row of the table in FIG. 9C, 90 volts output is achieved by closing switches S1, S4 and S7 of the plurality of switches, thereby using batteries B1, B2, B3, and B4. It will be understood that this output of 90 volts is obtained from the cumulation of the one cell of battery B1 (6 v.), two cells of battery B2 (12 v.), the four cells of battery B3 (24 v.), and the eight cells of battery B4 (48 v.).

It will be understood by those skilled in the art that the battery bank circuit of the present invention teaches an underlying relationship between the number of battery banks and corresponding number of switches prerequisite to achieving the novel results described. In particular, for B battery banks and S switches, the formula:

$$S = 3(B-1) \tag{1}$$

mathematically communicates this relationship for two or more battery banks. It will also be understood that while the voltage for each individual cell contained in the battery bank assembly may be different, it is preferable to have the same voltage for each. Of course, the relationship of 1C, 2C, 4C, 8C, etc., for successive battery banks must be sustained if each voltage step is to provide the same step-wise differential, which is preferable to attain smooth motor speed control as contemplated by the present invention.

It will be understood that the circuit of the present invention teaches a unique network of a plurality of battery cells and a corresponding plurality of switches. By strategically arranging this corresponding set of plurality of battery cells and plurality of switches, each configuration of switches that are disposed in the on-state provides a stair-step voltage attributable to the battery cells that are active in a series circuit. The load is uniformly distributed among all of such battery cells that are in the configured series circuit. As has been hereinbefore described in detail, switches of the circuit taught by the present invention either place each battery cell in or out of the series circuit.

Switches contemplated by the present invention, as schematically depicted in FIGS. 1–4, may be off-the-shelf electro-mechanical relays or solid state devices rated for the maximum current of the load, and the maximum voltage of the batteries all in series. As is known in the art, control could be as simple as a multi-position, multi-contact rotary switch such as Electroswitch Model PA-3007, or as complicated as a programmable microprocessor as such Z-World BL1700. Control strategies depend on the type of load and the goals and objectives of the system. Under the present invention, other enhancements to the circuit also depend on the type of load and the objective of the system. Typical examples are circuit fault protection, circuit overload protection, relay contact spark suppression, output filtering, and surge suppression.

It is contemplated that the present invention will be applicable whenever a variable voltage is required from a power source composed of a plurality of low voltage units, such as storage batteries. Electric vehicles, of course, are particularly interesting examples. To vary the speed of a DC motor in an electric car, as is well known in the art, a control device varies the voltage from the batteries to the armature and field coils of the motor. From zero speed to about one third of the vehicle's maximum speed, the armature voltage is varied from zero to maximum, while the field voltage is held constant at maximum. From one third to full speed, the armature voltage is held at maximum while the field voltage is reduced to a lower value predetermined by motor-design. The field coil is low-power and easy to control with a low power solid state device or rheostat. Since the armature coil, however, requires hundreds of amperes, voltage control of this circuit is the most expensive aspect of the drive. The current prevalent method of control is to connect all the batteries in series and control the average voltage to the motor by turning the voltage to the motor on-and-off at a rapid rate.

Under this methodology, the voltage is left on for relatively short periods of time for low voltage, and left on for relatively long periods of time for maximum voltage. This method, also called pulse width modulation (PWM), only allows a maximum to minimum speed ratio of 4 to 1. Accordingly, a gear box and shifting are needed to provide the drive a practical speed range. Very high amperage components are also needed for this type of control because, even though voltage is reduced for low speed, amperage requirements of the DC motor are still at maximum when maximum torque is required. Using PWM, at half voltage, peak current through the controller will be twice as high as the motor's design rating. At one quarter voltage, the current will be four times as high. It will be appreciated by those skilled in the art that this inverse relation of peak current to speed, unfortunately, translates into the controlling components being very high capacity and, thus, very expensive.

The present invention, fortunately, since electric vehicles are controlled by banks of low voltage batteries, affords the opportunity to control voltage to the motor armature by changing the number of batteries in series with the motor. As has hereinbefore described in detail, with a bank of 15 battery cells, 15 incremental voltage steps are available between zero and the maximum voltage. For example, if armature voltage controls the vehicle's speed from zero to 30 MPH, an embodiment of the present invention could regulate vehicle speed in two mile per hour increments. Field control would be used for speeds above 30 MPH.

Referring now to FIGS. 10 A–C, there is shown the application of this approach to an electric drive vehicle. FIG. 10A depicts a schematic of an embodiment of the control circuit of the present invention electrically interconnected with a vehicle DC motor and field control. The graph depicted in FIG. 10B, shows the relationships between the voltage on the armature, voltage on the field, and the speed of the vehicle. FIG. 10C shows a corresponding Switch Logic table as hereinbefore described in detail in the context of FIGS. 7C, 8C and 9C.

It will also be understood that the arrangement of batteries is also important for minimizing the number of components needed for switching battery cells in and out of the circuit. As hereinbefore described, the plurality of battery cells are arranged in series in groups of 1, 2, 4, and 8. If the battery cells are 6 volts each, then putting the 8-battery cell group in series with the 2-battery cell group, for example, will put 60 volts to the motor. Greater voltage range is achieved by adding more groups of battery cells that may be switched in and out of the circuit. For example, adding a 16-battery cell group would double the voltage range. Adding another 32-battery cell group would double the range again.

Switches incorporated into the present invention may be electromechanical or solid state. FIGS. 3, 5, and 6 show a battery bank circuit embodiment of the present invention with variations of the plurality of switches. In FIG. 3, a switch of the plurality of switches may be represented by an electro-mechanical relay. A solid state transistorized version of switches contemplated by the present invention is shown in FIG. 5. As is known in the art, solid state devices have many advantages over electro-mechanical relays and transistors are easy to switch on and off. Nevertheless, transistors are not the most robust and economical device available for power control. FIG. 6 depicts an embodiment of the present invention that uses a combination of solid state devices for reducing cost. Diodes and SCR's are relatively inexpensive compared to transistors and can be used to replace transistors in the battery bank circuit. SCR's can require complex circuitry to control; however, it will be appreciated that the circuit shown in FIG. 5 uses SCR's in locations that do not require special control circuitry, thereby reducing the cost of power components while not adding complexity to the controlling circuitry.

Another application of the present invention is for regenerative braking wherein the drive motor is used as a generator to put energy back into the batteries when slowing down. In particular, regenerative braking is provided by battery bank circuit embodiments of the present invention having switching components that are designed to allow bi-directional current flow. Bi-direction is a natural feature of electro-mechanical devices. Transistors are also bi-directional if operated in the inverted, as well as the normal region. Since SCR's are not bi-directional, using them in a circuit that allows regenerative braking will require two components in each position, one for current going to the motor, and one for current from the motor—now a generator—in regenerative braking mode.

Another advantage of the present invention when applied to electrical vehicle drives is that load on the batteries will be automatically distributed to all the cells during the normal driving cycle of the vehicle. Referring to the Switch Logic table in FIG. 10C, it is clearly seen that the "batteries in use" vary constantly over the range of speed from 0 to 30 MPH. It will be appreciated that the variable nature of city driving assures that uniform draining of all the battery cells will occur. When cruising at more than 30 MPH, all batteries are in series simultaneously and are, accordingly, equally loaded.

It is thus an important feature and object of this invention to provide a speed control system that takes advantage of the inherent incremental nature of portable DC power sources to not only reduce the cost of the drive system, but also to increase speed control range.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the present invention is to be measured by the scope of the appended claims herein.

What is claimed is:

1. An incremental voltage control circuit electrically interconnected with a load, said incremental voltage control circuit comprising:

a plurality of electrically interconnected battery-banks;
each of said battery-bank of said plurality of battery-banks having a plurality of battery cells electrically interconnected with a plurality of switching means;
said plurality of battery-banks is related to said plurality of switching means by the formula: $S = 3 * (B-1)$, where S represents said plurality of switching means and B represents said plurality of battery-banks, and where B is greater than one battery-bank; and said plurality of switching means in said plurality of battery-banks configured for selectively disposing none or a plurality of said battery cells of said plurality of battery-banks in a series relationship for providing a set of step voltages ranging from zero to a maximum voltage attainable from all of said plurality of series-connected battery cells being electrically connected to said load.

2. The incremental voltage control circuit recited in claim 1, wherein said plurality of battery-banks comprises at least a first battery-bank having a single battery cell, and a second battery-bank having two battery cells.

3. The incremental voltage control circuit recited in claim 2, wherein said successive plurality of battery-banks further comprises twice the number of battery cells as the previous battery-bank.

4. The incremental voltage control circuit recited in claim 3, wherein said predetermined set of step voltages is incremented in one cell increments.

5. The incremental voltage control circuit recited in claim 4, wherein each of said plurality of battery cells has an identical voltage.

6. The incremental voltage control circuit recited in claim 5, wherein loading throughout said plurality of battery-banks is evenly distributed across each of said plurality of battery cells.

7. The incremental voltage control circuit recited in claim 6, wherein said zero voltage is obtained from said plurality of battery cells of all said plurality of battery-banks when each of said plurality of switching means of all of said plurality of battery-banks is disposed in an open condition.

8. The incremental voltage control circuit recited in claim 6, wherein said step voltages are obtained from selected battery cells of said plurality of battery cells of all said plurality of battery-banks when corresponding switching means of said plurality of switching means of all of said plurality of battery-banks are selectively disposed in a combination of closed and open conditions.

* * * * *